United States Patent [19]
Pammer

[11] 3,793,068
[45] Feb. 19, 1974

[54] METHOD OF PRODUCING COATINGS TO BE USED AS MASKING, PASSIVATION, CONTACTING AND DOPING LAYERS ON SEMICONDUCTOR SURFACES

[75] Inventor: Erich Pammer, Munich, Germany

[73] Assignee: Siemens Aktiengesellschaft, Berlin and Munich, Germany

[22] Filed: May 24, 1971

[21] Appl. No.: 146,098

[30] Foreign Application Priority Data

May 26, 1970 Germany ........................... 2025779

[52] U.S. Cl. ................ 117/201, 117/221, 117/227, 117/229, 117/105.5, 117/106 R, 117/107.2 R, 117/123 A

[51] Int. Cl. ............................................ B44d 1/18

[58] Field of Search..... 117/106 R, 106 A, 107.2 R, 117/201, 227, 221, 105.5, 229, 123 A

[56] References Cited

UNITED STATES PATENTS

| | | | |
|---|---|---|---|
| 3,657,006 | 4/1972 | Fisher et al. | 117/201 |
| 3,700,498 | 10/1972 | Kanazawa et al. | 117/106 R X |
| 2,732,313 | 1/1956 | Cusano et al. | 117/106 R |
| 2,873,208 | 2/1959 | Charlton et al. | 117/107.2 R |
| 3,215,570 | 11/1965 | Andrews et al. | 117/107.2 R |
| 3,219,482 | 11/1965 | Jenkin | 117/107.2 R |
| 3,485,666 | 12/1969 | Sterling et al. | 117/230 |
| 3,519,479 | 7/1970 | Inoue et al. | 117/107.2 R |
| 3,594,227 | 7/1971 | Oswald | 117/107.2 R |
| 3,630,796 | 12/1971 | Yokozawa | 117/106 A |

*Primary Examiner*—Edward G. Whitby
*Attorney, Agent, or Firm*—Curt M. Avery; Arthur E. Wilfond; Herbert L. Lerner

[57] ABSTRACT

Semiconductor crystals are provided with metal, metal oxide and metal sulfide layers by heating the crystal wafer and subjecting it to the action of a mixture of gases, one of which is a compound containing an element to be included in the layer. The gases are mixed and caused to react immediately upon being put into contact with the wafer whereby the reaction product precipitates onto the surface of the wafer. The method is performed in an apparatus including a reaction chamber, and a supporting and heating stage for the wafers. The apparatus also includes a nozzle for ejecting the gas mixture directly above the surface of the wafer.

10 Claims, 1 Drawing Figure

PATENTED FEB 19 1974 3,793,068
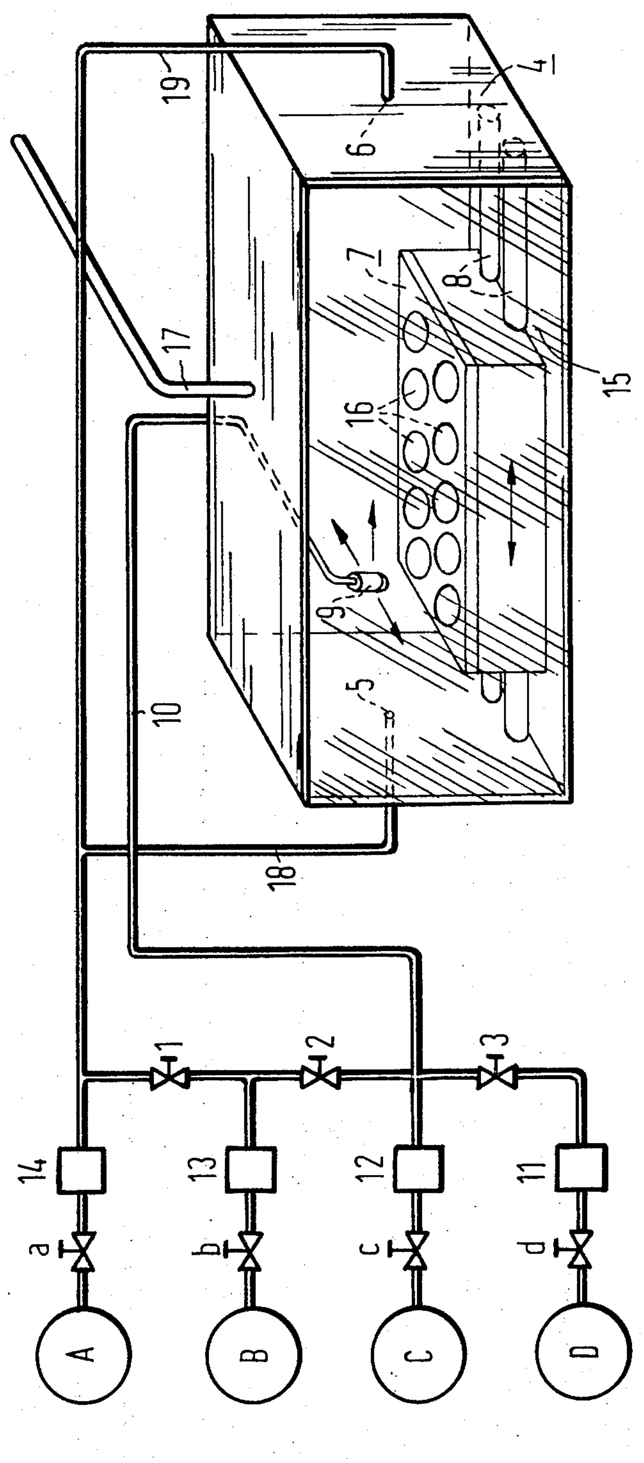

METHOD OF PRODUCING COATINGS TO BE USED AS MASKING, PASSIVATION, CONTACTING AND DOPING LAYERS ON SEMICONDUCTOR SURFACES

My invention relates to a method of producing coatings to be used as masking, passivating, contacting and doping layers on surfaces of semiconductor crystals consisting particularly of monocrystalline silicon, germanium or an $A^{III}B^{V}$ compound. More specifically, the surface of the heated crystals is subjected to the effect of a gaseous compound of the element to be precipitated if desired together with a gas which participates in the reaction.

During the production of coatings to be used as passivating, masking, doping and contacting layers on semiconductor surfaces, care must be taken that these layers have a sufficiently high adherence with respect to the substrate and that the formation of these layers be very uniform, non-porous and homogeneous with respect to their thickness. Furthermore, they should not contain any traces of contaminating substances.

It is an object of my invention to produce such layers while reliably meeting all of these disadvantages.

To this end, and in accordance with the invention, the vapors of the compound containing the element to be precipitated and the gas which participates in the reaction are mixed only at the moment when the vapors excape from the nozzle. The reactants must be diluted to such an extent that reaction occurs immediately when the diluted reactants impinge upon the semiconductor crystal wafers which are situated on a heated substrate and which are heated to at least 300°C.

The desired coatings, for example, the oxides or nitrides to be used as masking layers or the pure metals to be used as contacting layers, precipitate in the form of a firmly adhering layer on the surface of the crystal. When the starting materials are very readily dissociable and therefore dissociate prematurely on the hot tubular walls, etc. of the apparatus, the method according to the invention is of particular advantage. Preferably, the amount of the compound which contains the element to be precipitated is limited to a maximum of 10 Vol. percent, preferably 0.1 to 0.5 Vol. percent.

To produce oxide layers which may be used in particular as passivating and masking layers and also as solid dopant sources, the corresponding organo-metal compound is used as the gaseous compound of the element to be precipitated while air, oxygen, nitrogen dioxide, nitrogen monoxide or dinitrogen oxide is used as a gaseous atmosphere. It is equally possible to work with a gas atmosphere consisting of water vapor and/or carbon dioxide. As the gaseous compounds of the element are precipitated, the halides, hydrides or esters of the respective element are dissociated.

To produce sulfide layers in the same manner as above, hydrogen sulfide is used as the gas atmosphere.

It is also within the scope of the invention to admix inert, non-oxidizing gases, such as nitrogen or argon for the production of pure metal coatings on semiconductor surfaces. Thus, in order to produce nickel-chromium or molybdenum layers, the respective carbonyls are used as the gaseous compound of the element being precipitated while the carrier gas is a mixture of nitrogen and argon. During the precipitation process, the semiconductor crystal wafers are heated to a temperature of 350° to 500°C.

For producing aluminum layers, it is expedient to use aluminum triisobutyl as the gaseous compound and a nitrogen-argon mixture as the carrier gas.

Another feature of the invention provides that halides and esters of the respective elements be used as gaseous compounds in the production of pure metal coatings and that reducing, gaseous substances such as pure hydrogen or mixtures thereof with carbon monoxide, be admixed with the respective elements.

Particularly pure metal layers may be formed on semiconductor crystals, preferably of silicon or germanium, from the following metals: gallium, indium, thallium, tin, lead, arsenic, antimony, bismuth, selenium, tellurium, chromium, molybdenum, tungsten, vanadium, niobium, tantalum, titanium, zirconium, hafnium, zinc and cadmium.

By virtue of the invention, it is possible to sequentially apply several, different layers to the substrate; for example, one can apply metal-metal layers, insulator-metal-insulator layers, etc. in a relatively easy manner.

The method according to the invention permits silicon and other semiconductor wafers with dense coatings of any desired thickness, to be produced in a simple manner. These wafers with the coatings thereon are used as masking-passivating-contacting and doping layers. The uniformity of the thickness of the layers depends on the uniformity of the passage of the gas current across the substrate and can be easily adapted to tolerances of less than 5 percent.

Other specifics concerning the method may be derived from the single illustration on the accompanying drawing, with reference to the following examples:

EXAMPLE 1:

A, B, C and D are storage containers, such as pressure gas bottles; *a*, *b*, *c* and *d* are dual precision control valves used for an exact adjustment of the flow velocity, and are controlled by means of flow meters 11, 12, 13 and 14. Shut-off valves are indicated by numerals 1, 2 and 3 and are located between flow meters 14 and 13, 13 and 12, and 12 and 11, respectively.

Storage container A contains the gas, such as an atmospheric gas, which participates in the reaction and which rinses metal box 4 during the test through openings 5 and 6 located in two opposite walls of the box 4.

Storage container B contains the rinsing and carrier gas, e.g., nitrogen or argon.

Storage container C contains the pure or diluted reaction gas, for example, arsenic hydride ($AsH_3$). Storage container D contains a second reaction gas, for example, silane ($SiH_4$) for the precipitation of oxide and sulfide mixtures or metal alloys.

The front wall of the stainless steel box 4 is formed by an upward hinged, gas-tightly sealed quartz glass window 15 which may not necessarily occupy the entire front of the steel box 4. The remaining walls may, as necessary, be cooled by air or water. Situated in the box 4 is an electrically heatable, rectangular planar plate 7, which is mechanically movable along two parallel metal tracks 8. Semiconductor wafers 16 on which layers are to be precipitated are situated on the plate 7. Situated above the wafers 16 is a replaceable nozzle 9 which passes reaction gas via line 10 from container C, or a mixture from containers C and D, to the heated semiconductor wafers 16.

With the aid of a motor (not shown) which is located in the rear part or outside the box 4, nozzle 9 is moved transversely and longitudinally during emission of the gases therefrom so that all wafers are coated sequentially. Via opening 17 in the top surface of box 4, the exhaust gases are removed.

When arsenic trisulfide layers are produced, the plate temperature is 280°C, and storage container A is filled with hydrogen sulfide, storage container B with nitrogen, and storage container C is filled with 0.5 percent arsenic hydride in nitrogen.

The flow velocity with simultaneously admixed nitrogen, from storage container B out of nozzle 9, is equal to 2 to 3 liter/min gas mixture (nitrogen:arsenic hydride ratio of 200:1). At the same time, the box 4 is provided through conduits 18 and 19 with a hydrogen sulfide ($H_2S$) atmosphere at 3 liter/min via both openings 5 and 6. During the inpinging of the arsenic hydride upon the silicon wafers 16 which are heated to 280°C, the arsenic hydride reacts with hydrogen sulfide under formation of tightly adhering, dense arsenic sulfide glass layers in accordance with the reaction equation:

$$2AsH_3 + 3H_2S = As_2S_3 + 6H_2$$

In the same manner, antimony sulfide ($Sb_2S_3$) layers can be produced which are used as coatings for videcons and the like. Gas bottle C is replaced with an apparatus wherein $SbH_3$ is formed in situ, because of the short lifetime of $SbH_3$ or more preferably is replaced by a bubbler vessel with liquid $Sb(Ch_3)_3$ through which nitrogen is passed at 20°C at 1 liter/min. The wafer temperature is preferably 400° to 500°C. All other gas ratios are the same as during the production of $As_2S_3$.

EXAMPLE 2: PRODUCTION OF NICKEL LAYERS

The storage container C is a washing bottle with liquid nickel carbonyl and has a temperature of 0°C. One liter of argon/min. is bubbled through this container. The storage container B also contains argon which flows with the gas in C through shut-off valve 2, at 2 liters/min. The storage container A has hydrogen which flows through openings 5 and 6 into the box 4 at 5 liters/min. A mixture of 3 percent hydrogen and 97 percent nitrogen at 5 liters/min is preferable to pure hydrogen. The temperature of the heated crystal wafers is approximately 450°C.

If the storage container D is also replaced by a bubbler vessel, e.g., with $Sb(CH_3)_3$, nickel-antimony alloy layers may be produced.

EXAMPLE 3:

Silicon nitride layers on silicon crystal wafers are obtained by introducing 0.5%; $SiH_4$ in $N_2$ from the nozzle at 3 liters/min upon a plate heated to 600–800°C with silicon crystal wafers. The supplied atmosphere is then ammonia at 4 liters/min.

EXAMPLE 4:

$GeO_2$-$SiO_2$-$As_2O_3$ glass layers (important for full emitters) on silicon, are obtained according to the method of the invention by introducing a gas mixture of 0.25% $SiH_4$, 0.25% $GeH_4$, 0.1% $AsH_3$ in argon at 3 liters/min., at a plate temperature of 350°C. The atmosphere in box 4 is atmospheric oxygen.

It will thus be seen that the objects set forth above, among those made apparent from the preceding description, are efficiently attained and, since certain changes may be made in the above method and apparatus without departing from the scope of the invention, it is intended that all matter contained in the above description and shown in the accompanying drawing shall be interpreted as illustrative and not in a limiting sense.

I claim:

1. A method of producing a sulfide layer on the surface of a substrate formed of a monocrystalline silicon, germanium or $A^{III}B^{V}$ compound, wherein the substrate is subjected to the action of an admixture of reaction gases, which comprises the steps of admixing a first reaction gas consisting of arsenic hydride or antimony hydride with an inert carrier gas; advancing the hydride-inert gas mixture into a reactive chamber containing said substrate; introducing a second reaction gas consisting of hydrogen sulfide into the chamber along a path independent to the hydride-inert gas mixture; heating the substrate surface to be coated within the chamber; positioning spray nozzles that are connected to respective supply sources of the gases, in the proximity to the substrate material; and separately directing the first reaction gas mixture and the second reaction gas by nozzle means onto a heated substrate surface, causing such impinging gases to react on the surface.

2. A method as claimed in claim 1, wherein: the substrate surface is heated to a temperature of between 250° to 300°C.

3. A method as claimed in claim 1, wherein: the concentration of the respective hydrides in the reaction chamber varies between 0.1 to 0.5 percent by volume.

4. A method as claimed in claim 1, wherein the respective hydrides in the reaction chamber amounts to a maximum of 10 percent by volume.

5. A method as claimed in claim 1 wherein: the mixture of inert carrier gas and hydride gas has a mixing ratio of 200 : 1.

6. A method as claimed in claim 1, wherein: the inert carrier gas consists of a gas selected from the group consisting of nitrogen and the noble gases.

7. A method as claimed in claim 1, wherein: the mixture comprising the carrier gas and the respective hydride gas flows at the rate of 2 to 3 liters/minute.

8. A method as claimed in claim 1, wherein: the mixture of carrier gas and respective hydride gas is directed to the substrate surface by nozzle means adapted to move in a transverse and longitudinal direction with respect to the substrate.

9. In a method of coating a solid layer of inorganic materal on the surface of a heated semiconductor crystal wafer which is subjected, in a reaction vessel, to the action of a reaction gas that deposits the respective coating material at the temperature of the semiconductor wafer on a heated substrate, the reaction gas containing two active components, the coating material tending to deposit at the deposition temperature only in the presence of both active components of the reaction gas, and fresh reaction gas being introduced into the reaction vessel containing the semiconductor wafers that are to be coated and spent reaction gas being discharged from the reaction vessel continually during the deposition process, the improvement therein which comprises initially producing in a flow-through operation an atmosphere containing only one active component of the reaction gas in the reaction vessel containing the heated semiconductor wafers, and only thereafter supplying the other component in the form of a gas stream from a nozzle displaceable over and directed toward the heated semiconductor wafers, the gas stream being in greatly diluted state and having a concentration of at most 10 Vol. percent of the coating material to be deposited, so as to restrict the formation of the coating material to the surface of the heated semiconductor wafers.

10. Method according to claim 9 wherein the solid layer of inorganic material is pure metal, and which comprises reducing to the metal per se a gaseous halogenide of the metal at the surface of the heated semiconductor wafers, by heating the semiconductor wafers in a hydrogen atmosphere and passing a stream of the gaseous halogenide diluted with an inert gas over the surface of the semiconductor wafers.

* * * * *